May 30, 1950     W. S. WISEMAN     2,509,898
QUICK REVERSING ELECTRIC MOTOR
Filed Oct. 28, 1946     2 Sheets-Sheet 1
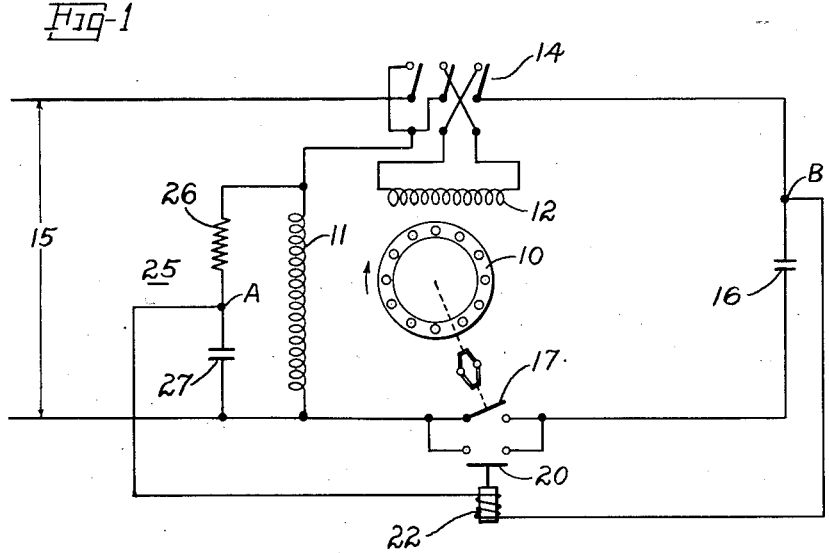
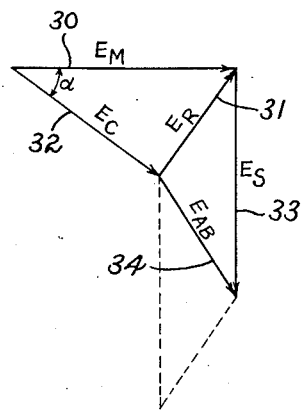
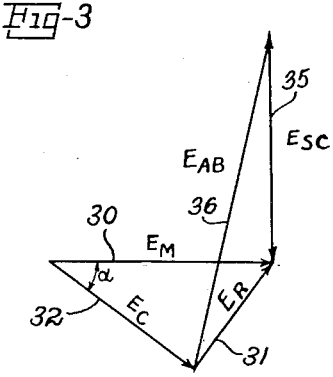
INVENTOR.
Walter S. Wiseman
BY
Marechal Biebel
ATTORNEYS

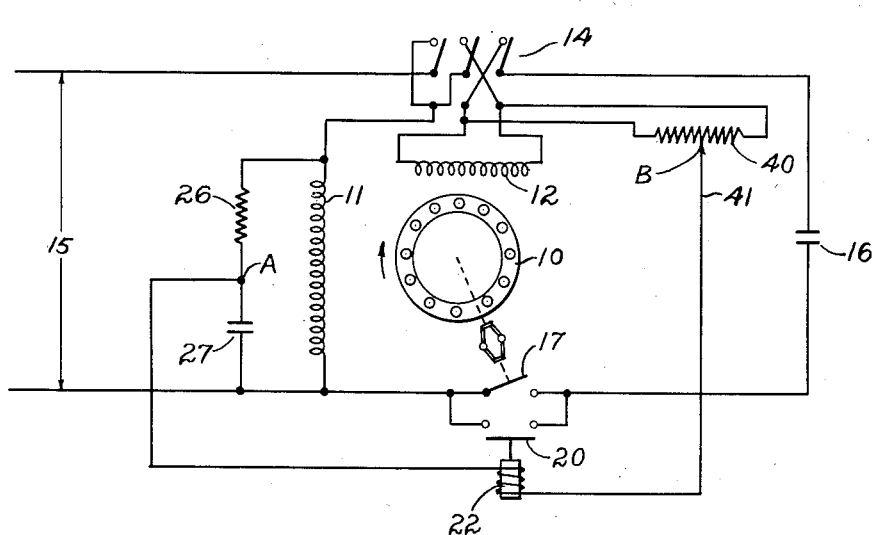
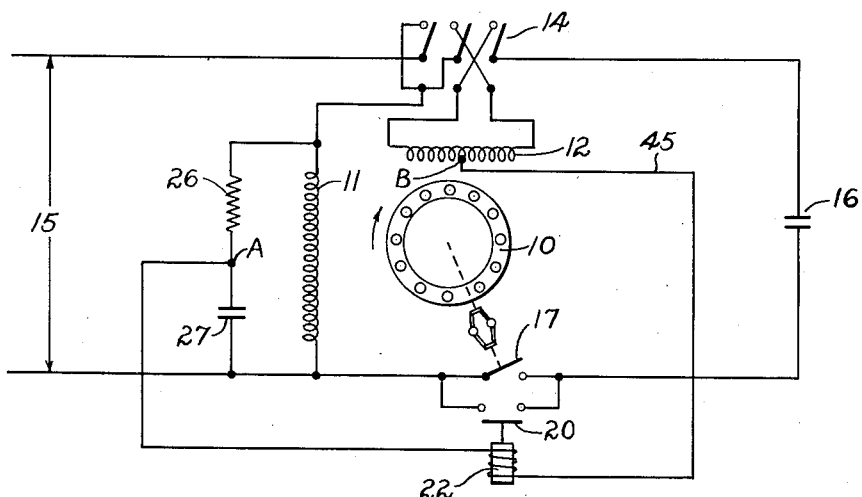

Patented May 30, 1950

2,509,898

UNITED STATES PATENT OFFICE 2,509,898

QUICK REVERSING ELECTRIC MOTOR

Walter S. Wiseman, Dayton, Ohio, assignor to The Leland Electric Company, Dayton, Ohio, a corporation of Ohio Application October 28, 1946, Serial No. 706,180

8 Claims. (Cl. 318—207)

This invention relates to motors and more particularly to controls for reversing the direction of rotation thereof.

It is a principal object of the invention to provide a simple and easily operated control system for a single phase induction motor of the squirrel cage type for quickly reversing the direction of rotation of the motor.

It is also an object to provide such a control system which makes use of the normal centrifugal switch of the motor in conjunction with additional simple, inexpensive, and easily installed equipment such that the entire system is economical, reliable, and highly satisfactory in operation.

It is also an object to provide such a control system which is directly applicable to a condenser type single phase induction motor of the usual construction without requiring rebuilding or replacement of the motor equipment.

It is a further object to provide a quick reversing control system suitable for application to new motors and likewise readily applicable to existing motor installations without requiring substantial redesign or rebuilding of the usual motor equipment.

Other objects and advantages will be apparent from the following description, the accompanying drawings and the appended claims.

In the drawings—

Fig. 1 is a wiring diagram of a motor reversing control in accordance with the present invention;

Fig. 2 is a vector diagram showing the voltage conditions during normal running;

Fig. 3 is a vector diagram showing the voltage conditions at the instant of reversal; and Figs. 4 and 5 are diagrammatic views showing modified forms of the invention.

The normal characteristics of a single phase capacitor start or split phase induction motor are such that reversal of the power supply to either the main or the starting winding does not develop any counter-rotative torque, and in fact is such that the normal tendency of the motor is to continue to rotate in the same direction. In order therefore to secure reversal, it is ordinarily necessary to allow the motor to slow down before the connections to its windings are reversed, so that the centrifugal switch which controls the starting winding will be closed, this usually requiring a substantial reduction in motor speed. This necessity of allowing time for the motor to slow down results in a material delay in the reversing of the motor, and in many instances such time delay is highly undesirable.

Although certain types of quick reversing circuits have been developed, the present invention has the advantage that it provides a quick reversing control for such single phase induction motors, the additional control mechanism required being relatively simple and inexpensive, and not such as to be likely to get out of order or to alter or modify the normal motor characteristics. It has the further advantage that not only can it be readily and simply installed on new motor constructions but may likewise be incorporated in existing motor constructions without changing the basic motor structure and with only a minor change required in the regular motor connections. It provides for manual or automatic reversing of the motor with highly effective results and with the motor being stopped and reversed practically instantaneously upon operation of the reversing switch.

Referring to the drawings which disclose a preferred embodiment of the invention, the rotor of the motor is shown at 10 in the form of a squirrel-cage type of construction. The main field winding is shown at 11 with the starting winding 12 being spaced in quadrature relative thereto, in accordance with the usual practice. A triple pole, double throw combined line and reversing switch 14 is provided for connecting both the main and the starting windings to a power source indicated at 15, the switch incorporating connections for reversing the direction of the current flow through the starting winding when thrown from one closed circuit position to the other. The condenser 16 and the centrifugal switch 17 are shown as connected in series with the starting winding so as to be included in the circuit when switch 14 is closed in either direction.

In accordance with the present invention a relay switch 20 is provided having a single circuit connected directly across the contacts of centrifugal switch 17 so that it is in parallel therewith. This relay switch is stationary and thus its use does not require any rearrangement or change of operating characteristics of the centrifugal switch. The relay may be conveniently connected to stationary terminals, one side being connected to one of the main line terminals, and the other to the condenser 16, as indicated.

An operating coil 22 is provided for effecting the closing of the switch contacts of relay 20, the relay being normally in open circuit position and being closed upon application of a sufficiently high voltage to its operating coil 22.

In order to provide a source of voltage suitable for selectively energizing relay coil 22 and thus to operate and close switch contacts 20, a phase splitting network 25 is provided and as shown is conveniently connected across the main field winding 11 so that it will be energized in either closed circuit position of the reversing switch 14.

This network comprises a combined resistance and reactance, and as shown is composed of a resistor 26 and a condenser 27, a condenser being preferred although an inductive reactance may alternatively be used if desired. From the midpoint A in the network a connection is made to one side of relay coil 22, and the other side of such relay coil is connected to the point B between the starting winding 12 and the capacitor 16.

Referring now to the vector diagrams shown in Figs. 2 and 3, the main line voltage $E_M$ is indicated at 30, the voltage across the resistor 26 being indicated at 31 as $E_R$, and the voltage across condenser 27 being indicated at 32 as $E_C$. These voltages are arranged in the relationship shown with $E_R$ being of approximately the same value as $E_C$ or somewhat smaller than $E_C$.

The voltage across the starting winding following the opening of centrifugal switch 17 is an induced voltage in quadrature relation with the main line voltage and is thus indicated by vector 33 as $E_S$. During normal running conditions, therefore, it will be apparent that the actual voltage difference between points A and B will be as indicated by the resultant vector 34, marked as $E_{AB}$, and from a study of Fig. 2 it will be apparent that such voltage vector is somewhat smaller in magnitude than either $E_M$ or $E_S$.

Under these conditions the relay coil 22 is not sufficiently highly energized to attract its armature and consequently during the entire normal running operation of the motor, this relay remains in open circuit position and since the centrifugal switch 17 is also in open circuit position during normal running, the circuit to the starting winding remains open and the motor operates in the normal manner of a single phase induction motor.

When however reversing switch 14 is thrown to the opposite position, the voltage conditions are as illustrated in the vector diagram of Fig. 3. The voltage vectors $E_M$, $E_R$ and $E_C$ are the same as during running. However at the instant of reversal the voltage in the starting winding is reversed, and thus the voltage vector 35 marked $E_{SC}$, is illustrated as acting in the opposite direction to $E_S$. Completion of the vector diagram as shown in dotted lines gives a resultant voltage vector 36, marked $E_{AB}$ as the voltage effective upon the relay coil 22, which it will be evident in this case is not only effective in different phase relation, but actually is substantially greater in magnitude than vector 34. The characteristics of relay coil 22 are such that under this increased voltage condition, it becomes energized and attracting its armature, causes the closing of its contacts 20, thus closing the circuit through the starting winding.

Upon the closing of such circuit the motor is connected for operation in the reverse direction and a strong braking and counter-rotational force is thus developed. As a result the motor very quickly slows down under this counter-rotating force and immediately begins to accelerate toward full speed in the opposite direction. During this process, which in practice takes place in a short interval of time, the centrifugal switch 17 closes to maintain the circuit through the starting winding, relay 22 being deenergized as the resultant voltage vector falls. The circuit through the starting winding is not interrupted however as in the meantime the centrifugal switch has closed. Thus as the motor reverses its rotation and comes up toward normal speed in the reverse direction, the centrifugal switch will function in the normal manner, to cut out the starting winding at the proper time, without additional interference or further action on the part of the relay 22.

It has been found that a maximum difference of the two voltage vectors 34 and 36 is obtained under the conditions where the values of capacitance 27 and resistance 26 are approximately in the ratio of the square root of 2. This indicates that for this condition the angle $a$ is the angle whose tangent is .707, or is an angle of approximately 35°. This provides a difference between the two voltage vectors effective upon the relay 22 of 2.4 to 1, affording an adequate margin for assuring the proper selective response of this relay coil.

As a specific example of a circuit suitable for use with a capacitor starting single phase motor of 1/3 H. P., the capacity of the condenser 27 was 7 mf. and the resistance 26 was of 384 ohms, resulting in a vector condition in which the angle $a$ was of about 45°. In order to reduce this angle to about 35°, indicated as providing the greatest difference in the resulting voltage vectors, the capacity was decreased to about 5 mf., keeping the same value of resistance.

Figs. 4 and 5 show somewhat modified circuit arrangements for accomplishing the same results. In the circuit shown in Fig. 4 a variable resistor 40 is connected across the starting winding 12 and the line from the operating coil 22 of the relay is connected at point B to a variable tap 41, which thus operates as a potentiometer. With this arrangement the actual voltage effective upon relay coil 22 can be varied throughout the entire range from the potential of one side of the starting winding to the potential of the other, and this is sometimes desirable as providing for a lesser maximum voltage for application to relay coils of standard voltage ratings.

In the circuit shown in Fig. 5 the line 45 from the relay coil 22 is connected at point B to an intermediate point in the starting winding itself. This point may conveniently be the mid-point, and as described this will result in developing a lesser maximum voltage for application to the relay coil.

The principle and mode of operation of the control shown in Figs. 4 and 5 is otherwise essentially similar to that of the circuit shown in Fig. 1, and further detailed analysis of the operation is not necessary.

The invention thus provides a simple and highly satisfactory control for quickly reversing a single phase capacitor motor which is simple and satisfactory in operation, which provides for practically instantaneous reversal of the motor, is inexpensive and is not subject to operating difficulties or likely to require frequent attention, and which further can be readily installed without substantially modifying existing motor construction.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A control system for quickly reversing a single phase condenser type motor having a main winding, a starting winding displaced relative thereto, a condenser in the circuit of said starting winding, and a reversing switch for controlling said windings comprising a phase splitting network connected across said main winding, a centrifugal switch in the circuit of said condenser and said starting winding, a relay having an operating coil connected to said network and to said starting winding to be responsive to the voltage vector difference therebetween, and operating contacts controlled by said relay and connected in parallel with said centrifugal switch to provide for closing the circuit to said starting winding promptly upon the closing of said reversing switch and adapted to be released to open circuit position after the closing of said centrifugal switch.

2. A control system for quickly reversing a single phase condenser type motor having a main winding, a starting winding displaced relative thereto, a condenser in the circuit of said starting winding, and a reversing switch for controlling said windings comprising a phase splitting network connected across said main winding, a centrifugal switch in the circuit of said condenser and said starting winding, a relay having an operating coil connected to said network and to said starting winding to be responsive to the voltage vector difference therebetween, said relay remaining in normal open circuit position under running conditions, and operating contacts controlled by said relay and connected in parallel with said centrifugal switch and adapted to be closed immediately upon operation of said reversing switch in response to the increased voltage vector difference supplied thereto.

3. A quickly reversing single phase motor comprising a main running winding, a starting winding displaced from said main winding, a reversing switch controlling the connection of said windings, a condenser in circuit with said starting winding, a centrifugal switch in circuit with said starting winding and said condenser for disconnecting said starting winding when the motor has reached operating speed, a relay having contacts connected in parallel with said centrifugal switch, an operating coil for actuating said relay normally maintaining said contacts in open circuit position during running conditions, means for deriving a voltage which varies substantially between a higher value immediately following the closing of said reversing switch and a lower value during running conditions, and means connecting said operating coil to be responsive to said voltage to provide for opening of said relay contacts in response to said lower voltage condition and for closing of its said contacts in response to said higher voltage condition immediately upon actuation of said reversing switch with said motor running.

4. A control system for quickly reversing a capacitor start single phase induction motor having a main winding, a starting winding, a condenser in circuit with starting winding and a centrifugal switch for opening the circuit through said starting winding when the motor has attained running speed which comprises a relay having contacts connected in parallel with said centrifugal switch and adapted upon closing to establish a circuit through said starting winding while said centrifugal switch remains in said open position, an operating coil for said relay maintaining said contacts in open circuit position during normal running conditions, means connected to the circuit of said starting winding for deriving a voltage vector having predetermined characteristics during normal running of the motor and distinctively different characteristics immediately following operation of said reversing switch and while rotation of the motor continues in the same direction, and means for selectively applying said voltage vector to said operating coil for actuation of said relay only during the interval immediately following operation of said reversing switch.

5. A control system for quickly reversing a capacitor start single phase induction motor having a main winding, a reversibly connected starting winding, a condenser in circuit with starting winding and a centrifugal switch for opening the circuit through said starting winding when the motor has attained running speed which comprises a relay having contacts conected in parallel with said centrifugal switch and adapted upon closing to establish a circuit through said starting winding while said centrifugal switch remains in said open position, a voltage network connected across said main winding selectively responsive to the voltage condition during running and upon reversal of said starting winding, and an operating coil for said relay connected to said network and to said starting winding for closing of said relay contacts upon reversed closing of said starting winding.

6. A quick reversing single phase motor comprising a main running winding, a starting winding displaced from said main winding, a reversing switch for controlling the connection of said windings, phase displacing means in circuit with said starting winding, a centrifugal switch for disconnecting said starting winding when the motor has reached running speed in either direction, a relay for closing a circuit to said starting winding paralleling said centrifugal switch to cause stopping or reversal of said motor and for opening said circuit during normal running of said motor, an operating coil for operating said relay upon being energized to close said parallel circuit, and means connecting said operating coil in circuit with said starting winding for developing an energizing voltage effective thereupon to cause operation of said relay and the closing of said parallel circuit immediately upon the closing of said reversing switch.

7. A quick reversing single phase motor comprising a main running winding, a starting winding displaced from said main winding, a reversing switch controlling the connection of said windings, phase displacing means in circuit with said starting winding, a centrifugal switch in circuit with said starting winding for disconnecting said starting winding when the motor has reached operating speed, a relay having its contacts connected in parallel with said centrifugal switch, an operating coil for said relay normally in an inoperative condition and adapted to maintain said contacts in open circuit position during normal running conditions, and a circuit for said operating coil including a connection to said starting winding for applying a potential to said coil in response to continued rotation of said motor immediately following the closing of said reversing switch for effecting the operation thereof with immediate closing of said parallel circuit.

8. A control system for quickly reversing a capacitor start single phase induction motor having a main winding, a starting winding, a condenser in circuit with said starting winding and a centrifugal switch for opening the circuit through said starting winding when the motor has attained running speed which comprises a relay having contacts connected in parallel with said centrifugal switch and adapted upon closing to establish a circuit through said starting winding while said centrifugal switch is in open circuit position, an operating coil for said relay normally in an inoperative position during running conditions, and a circuit for said coil including a connection to said starting winding for applying an operating potential to said coil to effect actuation of said relay with the closing of said parallel circuit immediately following the closing of said reversing switch.

WALTER S. WISEMAN.

REFERENCES CITED

The following references are of record in the file of this patent:

UNITED STATES PATENTS

| Number | Name | Date |
|---|---|---|
| 2,280,888 | Buchanan | Apr. 28, 1942 |
| 2,276,057 | McCormick | Mar. 10, 1942 |
| 2,406,782 | Lewis | Sept. 3, 1946 |
| 2,425,312 | Gower | Aug. 12, 1947 |